United States Patent
Weaver et al.

(10) Patent No.: US 12,157,850 B2
(45) Date of Patent: Dec. 3, 2024

(54) CONDITIONING COMPOSITION FOR OPTIMIZING SOIL OR SAND SURFACE CONDITIONS

(71) Applicant: Mitchell Products, LLC, Millville, NJ (US)

(72) Inventors: Lehn Weaver, Mullica Hill, NJ (US); David Mitchell, Sewell, NJ (US)

(73) Assignee: MITCHELL PRODUCTS, LLC, Millville, NJ (US)

( * ) Notice: Subject to any disclaimer, the term of this patent is extended or adjusted under 35 U.S.C. 154(b) by 0 days.

(21) Appl. No.: 18/430,215

(22) Filed: Feb. 1, 2024

(65) Prior Publication Data

US 2024/0254393 A1    Aug. 1, 2024

Related U.S. Application Data (60) Provisional application No. 63/482,699, filed on Feb. 1, 2023.

(51) Int. Cl.
*C09K 17/32* (2006.01)
*C09K 105/00* (2006.01)

(52) U.S. Cl.
CPC .......... *C09K 17/32* (2013.01); *C09K 2105/00* (2013.01)

(58) Field of Classification Search
CPC .......................... C09K 17/32; C09K 2105/00
See application file for complete search history.

(56) References Cited

U.S. PATENT DOCUMENTS

| | | | |
|---|---|---|---|
| 2004/0091324 A1* | 5/2004 | Schilling | C09K 17/48 252/88.1 |
| 2006/0168885 A1 | 8/2006 | Kimoto et al. | |
| 2015/0275085 A1 | 10/2015 | Cho et al. | |
| 2021/0269717 A1* | 9/2021 | Na | C09K 17/14 |

FOREIGN PATENT DOCUMENTS

CN    111909660 A    11/2020

OTHER PUBLICATIONS

International Search Report and Written Opinion dated May 17, 2024 issued in PCT Application No. PCT/US24/13818 (11 pages).

* cited by examiner

*Primary Examiner* — Kyle Armstrong
(74) *Attorney, Agent, or Firm* — FOX ROTHSCHILD LLP (57) ABSTRACT

This patent document provides a conditioning formulation or composition containing a rheology modifying polymer and optionally one or more of a dispersant, a thickener, a gelling agent, a glue or resin, a wetting agent, a buffer, an anti-foam agent, and soil amendments. Also disclosed is the use of the formulation for optimizing the soil or sand surface of a field.

19 Claims, 6 Drawing Sheets

Particle Size Analysis

| | |
|---|---|
| % Gravel | 0.7% |
| % Sand | 97.9% |
| % Silt | 0.9% |
| % Clay | 0.5% |

Sand Sieve Size Analysis

| | (ASTM F-1632-03) | Bunker Sand Recommendations* |
|---|---|---|
| (No. 10) Gravel (> 2.0 mm) | 0.7% | ≤ 2% |
| (No. 18) Very Coarse Sand (2.0 – 1.0 mm) | 16.2% | ≤ 15% |
| (No. 35) Coarse Sand (1.0 – 0.5 mm) | 37.8% | |
| (No. 60) Medium Sand (0.5 – 0.25 mm) | 28.3% | 78 – 100% |
| (No. 140) Fine Sand (0.25 – 0.10 mm) | 14.1% | |
| (No. 270) Very Fine Sand (0.10 – 0.05 mm) | 1.5% | ≤ 5% |
| Silt (0.05 – 0.002 mm) | 0.9% | ≤ 3% |
| Clay (< 0.002 mm) | 0.5% | |

*Brown and Thomas. 1986. Golf Course Management 54:64-70

| Angularity / Sphericity | Acid Reaction | D15 | D85 | Cu |
|---|---|---|---|---|
| Sub-Angular to Sub-Rounded / Medium Sphericity | None | 0.22 mm | 1.1 mm | 3.8 |

Physical Properties

ASTM F-1815-11

| Penetrometer Value (kg/cm²) and Interpretation | Crusting Potential | Color* - Dry Hue/Value/Chroma | Color* - Wet Hue/Value/Chroma | Hydraulic Conductivity (in/hr) |
|---|---|---|---|---|
| 2.7 - Very low tendency to bury | None | 10YR 8.5/1 White | 10YR 8/1 White | 36.9 |

*Munsell Soil Color Chart & Names

Particle Size Analysis

| % Gravel | 0.7% |
|---|---|
| % Sand | 97.9% |
| % Silt | 0.9% |
| % Clay | 0.5% |

Sand Sieve Size Analysis

| Sand Sieve Size Analysis | (ASTM F-1632-03) | Bunker Sand Recommendations* | Magnified Sand Particles |
|---|---|---|---|
| (No. 10) Gravel (> 2.0 mm) | 0.7% | ≤ 2% |  |
| (No. 18) Very Coarse Sand (2.0 - 1.0 mm) | 16.2% | ≤ 15% | |
| (No. 35) Coarse Sand (1.0 - 0.5 mm) | 37.8% | 78 - 100% | |
| (No. 60) Medium Sand (0.5 - 0.25 mm) | 28.3% | | |
| (No. 140) Fine Sand (0.25 - 0.10 mm) | 14.1% | | |
| (No. 270) Very Fine Sand (0.10 - 0.05 mm) | 1.5% | ≤ 5% | |
| Silt (0.05 - 0.002 mm) | 0.9% | ≤ 3% | |
| Clay (< 0.002 mm) | 0.5% | | |

*Brown and Thomas. 1986. Golf Course Management 54.64-70

| Angularity / Sphericity | Acid Reaction | D15 | D85 | Cu |
|---|---|---|---|---|
| Sub-Angular to Sub-Rounded / Medium Sphericity | None | 0.22 mm | 1.1 mm | 3.8 |

Physical Properties

ASTM F-1815-11

| Penetrometer Value (kg/cm²) and Interpretation | Crusting Potential | Color* - Dry Hue/Value/Chroma | Color* - Wet Hue/Value/Chroma | Hydraulic Conductivity (in/hr) |
|---|---|---|---|---|
| 2.7 - Very low tendency to bury | None | 10YR 8.5/1 White | 10YR 8/1 White | 36.9 |

*Munsell Soil Color Chart & Names

CONDITIONING COMPOSITION FOR OPTIMIZING SOIL OR SAND SURFACE CONDITIONS

CROSS-REFERENCE TO RELATED APPLICATIONS

This application claims priority to Provisional Application No. 63/482,699, filed Feb. 1, 2023, the disclosures of which is hereby incorporated by reference in the entirety.

TECHNICAL FIELD

This patent document relates to a conditioning composition and its use for optimizing soil or sand surface of a field, which include turf surfaces on sports fields (turf and infields), turf, bunker sands, path, and other playing surfaces.

BACKGROUND

Turf is critical to maintaining proper playing surfaces for numerous sports. The health of turf is dependent on many factors including soil structure, soil composition, turfgrass species and health, abiotic and biotic turfgrass stressors, nutrient inputs, mowing practices, cultural practices, sports-related wear and tear, the weather, and microenvironmental factors, amongst others. Without an effective turfgrass maintenance program, the turf surface can quickly degrade to the point that it impacts the playability of the sports field. Achieving high-quality playing surfaces is complicated, labor-intensive, and expensive. High quality turf maintenance programs require proper field construction and drainage, routine (sometimes daily) mowing of the turf, water management programs, irrigation, fertilization, re-seeding and over-seeding (in some environments), cultural practices (core aerification, sand-topdressing, drill and fill, deep vertical mowing, rolling, and sand injection), and integrative pest management programs. Sports playing surfaces can also be made of different soils (clay infields, sand bunkers on golf courses, dirt racetracks, etc). An entire industry provides groundskeepers, sports turf managers, golf course superintendents, and other sports field specialists with the tools, education, equipment, and products necessary to maintain high-quality playing surfaces.

A common goal for high-quality sports fields is to achieve a smooth, firm, and fast playing surface, which creates a smoother ball roll, faster and longer ball rolls, less turf damage under shear stress of an athlete's movements (often cleated), and improved athlete traction. On a golf course, turf firmness will also reduce ball mark injury on putting green surfaces, decrease divot size and injury, reduce ball penetration in sand bunkers (fried egg lies), reduce wind erosion of bunker sands, reduce bunker washout, and reduce maintenance costs. Of note, surface firmness is a key contributor to achieving the benefits of a high-quality sports playing surface.

Sports field and turfgrass managers use a variety of techniques to control surface firmness which fall under the categories of moisture management (irrigation, soil surfactants, sub-surface drainage, cultural practices to decrease organic matter), managing soil structure (use of engineered soils to alter the physical properties of the rootzone), and lightweight rolling (a practice commonly used on golf course greens). These practices impart many turf-firming benefits, but each have limitations.

Moisture management is a key to ensuring firm turf playing surfaces. In turf, water content is inversely proportionate to turf firmness (i.e. the more moisture in the turf the less firm the surface and vice versa). Therefore, cutting back on irrigation can impart increased firmness, but must be balanced by the water needs of living turfgrass. Rainfall can add to soil moisture which is a variable outside the control of the turfgrass manager. Many soil surfactant products claim "penetrant" properties to move excess water off the surface to speed soil dry-down and impart firmer playing surfaces. Recent data suggests that "penetrant" soil surfactants have limited ability to affect firmness, and "penetrant" firming benefits plateau at maximum label rates and in saturated soils. Furthermore, higher than label rates may result in turfgrass phytotoxicity limiting the "penetrant" dose used to facilitate downward water movement through the soil. Sub-surface drainage methods such as installing drainage tiles/lines beneath the soil surface to remove excess water can speed soil dry-down after rainfall but is expensive and time/labor intensive to install, can get clogged/damaged over time, and requires removing the playing surface/rootzone to access the sub-surface drainage system for repairs. Cultural practices to remove organic matter can also improve turf firmness indirectly by removing soil organic matter which holds excess soil moisture. Cultural practices include core aerification, sand-topdressing, drill and fill, deep vertical mowing, verticutting and sand-injection systems. Drawbacks to cultural practices include that they are time/labor intensive, expensive, disrupt the playing surface, require turfgrass recovery after being performed, can only be completed at specific times of the year, and require the playing surface to be shut down for the maintenance procedure which limits playing time on the turf surface. Rolling turf is another technique that can improve firmness, but the effects are short-lived, and implementation of rolling requires expensive machinery and is time/labor intensive.

The physical properties of a turfgrass soil will also impact water-holding capabilities and firmness of the turf. Sports turf managers will often use custom specialized engineered soils for their root zone mixes during construction, which have specified drainage (perc) rates, water-holding capacities, and firmness characteristics. Organic matter such as peat is a commonly used soil amendment in engineered root zone mixes for turf applications that increases water-holding capacity and soil moisture while decreasing firmness and drainage rates. However, once the soil physical properties are chosen and installed, they can't be changed without removing and replacing the entire rootzone mixture which is time/labor intensive, expensive, and disruptive to play. Furthermore, the physical properties of the rootzone will change over time as turfgrass alters the physical properties of the soil as it adds organic matter to the soil reducing turf firmness over time unless counter measures to reduce organic matter in the soil are employed. Cultural practices can help decrease the accumulation of organic matter over time, but each method has drawbacks as described above.

Moisture management is also key to maintaining firmness of sand in golf course sand bunkers. In sand bunkers, both too much water or too little water can lead to soft sand bunkers making it a challenge to maintain adequate bunker surface firmness when moisture levels are constantly changing after rain, irrigation, and from evaporative moisture losses in hot sunny weather. Golf course superintendents have limited options for altering moisture content in sand bunkers, as they are limited to renovating the bunkers or applying irrigation water directly to the bunkers. Sand bunker renovation involves removing all the sand from the original bunker and replacing it with sand that has different physical properties (particle size, particle size distribution, angularity of the sand, percolation rates, etc) which alter moisture holding and bunker sand surface firmness. The fast-draining qualities of sand bunkers requires frequent irrigation to maintain moisture levels. As this type of irrigation is typically limited to non-playable hours on a golf course, bunkers are left to dry out quickly in hot sunny weather leaving bunker sand surfaces soft. Irrigating bunkers is also time and labor intensive and requires access to water which is a limited natural resource in many locations. The physical properties of sand for golf course bunkers will also impact the firmness of the bunker sand. Custom sands are used to impact bunker sand drainage and firmness to varying degrees. However, these custom sands are expensive, are not available in all areas of the world, and once installed cannot be altered without being removed and replaced.

Therefore, a need exists to develop an effective and cost-efficient approach to optimize playing field surface conditions on turf, soil or sand surfaces of a field, which include surfaces on sports fields (turf and infields), turf, bunker sands, path, and other playing surfaces.

SUMMARY

The composition and method disclosed herein address such a need. The composition is non-surfactant-based and can be watered into the soil and sand of various fields including sports fields, turf, bunker sands, and other playing surfaces to improve the surface conditions such as firmness and shear strength as well as water retention, wind and water erosion control, and dust suppression. Besides being easily applied directly to soil or sand surface, it is non-phytotoxic and non-toxic. Further, it does not produce hydrophobic soil conditions and is effective without the need to cure.

An aspect of the present disclosure provides a method of optimizing soil or sand surface of a field. The method includes applying a formulation to the field, wherein the formulation comprises an effective amount of one or more rheology modifying polymers, wherein the one or more rheology modifying polymers are selected from the group consisting of alginate, carboxymethylcellulose, cellulose gum, copovidone, galactasol guar, guar gum, gum arabic, hydroxyethylcellulose, hydroxypropylmethylcellulose, methylcellulose, microcrystalline cellulose, poly-methacrylic acid, polyacrylamide, polyacrylic acid, polyanionic cellulose, polyethylene glycol, polypropylene glycols, polyvinyl ether polymers, polyvinylpyrrolidones, sodium acrylate polymer, sodium carrageenan, and xanthan gum.

In some embodiments, the one or more rheology modifying polymers are selected from the group consisting of alginate, carboxymethylcellulose, cellulose gum, hydroxypropylmethylcellulose, methylcellulose, microcrystalline cellulose, sodium carrageenan, and xanthan gum.

In some embodiments, the one or more rheology modifying polymers range from about 1% to about 30% by weight in the composition.

In some embodiments, at least 50% of the one or more rheology modifying polymers is microcrystalline cellulose. In some embodiments, the microcrystalline cellulose has an average particle size ranging from 20-100 micrometers.

In some embodiments, the one or more rheology modifying polymers comprise carboxymethylcellulose. In some embodiments, the carboxymethyl cellulose has molecular weight ranging from about 1,000,000 to about 1,200,000 Daltons. In some embodiments, the carboxymethyl cellulose has a substitution rate ranging from about 0.65 to about 0.75%. In some embodiments, the one or more rheology modifying polymers further comprise microcrystalline cellulose.

In some embodiments, at least 80% of the one or more rheology modifying polymers is xanthan gum. In some embodiments, the xanthan gum has a degree of branching less than 25%.

In some embodiments, at least 80% of the one or more rheology modifying polymers is sodium alginate. In some embodiments, the sodium alginate has a molecular weight ranging from about 40,000 to about 330,000 Daltons.

In some embodiments, the formulation further includes a dispersant, wherein the one or more rheology modifying polymers and the dispersant are in a ratio ranging from about 1:4 to about 10:1. In some embodiments, the dispersant is selected from the group consisting of anionic styrene acrylic co-polymer, ethoxylated-, styrenated-, phenoxy-, or ammonium salt (need more specifics or examples), ethylenediaminetetraacetic acid, lignin sulfonate, lignosulfonic acid ethoxylated sodium salt, lignosulfonic acid sodium salt, kraft lignin or alkali lignin, polyethylene oxide, polyvinyl pyrrolidone, powerblox d-205, powerblox d-518, sodium dioctyl sulfosuccinate, sodium dodecyl benzene sulfonate, sodium hexametaphosphate, naphthalene condensate, and sodium lignosulfonate. In some embodiments, the dispersant is sodium lignosulfonate. In some embodiments, the sodium lignosulfonate has a degree of sulfonation ranging from about 3% to about 4%.

In some embodiments, the method increases firmness of the sand surface of a sand bunker. In some embodiments, the amount of the one or more rheology modifying polymers in the formulation is selected and/or the formulation is applied in a frequency so that compressive force and/or shear force of the surface is increased by at least 1.5 times in comparison with an untreated surface. In some embodiments, the amount of the one or more rheology modifying polymers in the formulation is selected and/or the formulation is applied in a frequency so that volumetric water content is increased by 2-10 times in comparison with an untreated surface.

In some embodiments, the method limits fried egg lies and reduce erosion from wind and rain events in comparison with an untreated field.

DETAILED DESCRIPTION OF THE DRAWINGS

DETAILED DESCRIPTION OF THE INVENTION

Embodiments of this disclosure provide a composition for optimizing the soil or sand surface condition of a field, which include for example turf, bunker sands, dirt path or tracks, and other playing surfaces. The composition can improve various properties including increasing firmness and/or shear strength of the surface.

The use of the surface-firming composition results in benefits for turfgrass surfaces (smoother ball roll, faster and longer ball roll, less turf damage under shear stress of athlete's movements—often cleated, less ball mark injury on putting surfaces, and decreased divot size/injury) and for golf course bunkers (reduced ball penetration/fried egg lies, improved player traction, reduced sinking in when walking across the sand, less footprints, improved footing, easier to hit ball out of the sand, reduced bunker washout, reduced wind erosion, and reduced labor/maintenance costs). The application of turf-firming technologies to various soil surfaces has the added benefits of water retention, erosion control, dust suppression, and easy tank-mixing with other turf-applied chemicals such as soil fertilizers, micronutrients, fungicides, herbicides, pesticides, plant growth regulators and soil surfactants.

While the following text may reference or exemplify specific embodiments of a formulation, a kit or a method relating to the treatment or prevention of a disease, it is not intended to limit the scope of the formulation, kit or method to such particular reference or examples. Various modifications may be made by those skilled in the art, in view of practical and economic considerations, such as the specific form of the formulation and the amount or frequency of administration of the formulation for treating or preventing a disease or condition.

The articles "a" and "an" as used herein refer to "one or more" or "at least one," unless otherwise indicated. That is, reference to any element or component of an embodiment by the indefinite article "a" or "an" does not exclude the possibility that more than one element or component is present.

The term "about" as used herein refers to the referenced numeric indication plus or minus 10% of that referenced numeric indication. In some embodiments, "about" refers to the referenced numeric indication plus or minus 5% of that referenced numeric indication.

An aspect of the patent document provides a conditioning composition or formulation for optimizing or improving soil or sand surface of a field. The composition may be in the form of a solution or a suspension and generally includes:
  (a) one or more rheology modifying polymers;
  (b) optionally one or more rheology dispersants; and
  (c) optionally water.

Soil as a land surface material may contain clay, sand, and slit in various amounts depending on the location and utility of the surface. A soil surface includes for example, turf surfaces on sports fields (turf and infields of golf course or other ball game fields), clay infield, turf, dirt path or racetrack, and other natural or artificial playing surfaces. A sand surface may be a location for sports or outdoor activities containing for example bunker sands. Turf refers to a surface layer of land consisting of grass and the soil in which its roots grow.

The composition or formulation can be in any suitable form, including a liquid formulation, a powder formulation, a water dispersible granule formulation, a wettable powder formulation, and a pellet formulation, for application. In some embodiments, the formulation is in a liquid form, which can be further diluted to suit the particular needs of a field. In some embodiments, the formulation is in a powder form or a water dispersible granule, which can be diluted for spraying to a field.

The rheology modifying polymers may be natural or synthetic. Nonlimiting examples include alginate/sodium alginate, cellulose gum, copovidone, galactasol guar, guar gum, gum arabic, hydroxyethylcellulose, hydroxypropylmethylcellulose, methylcellulose, microcrystalline cellulose, carboxymethylcellulose, ethylmethylcellulose, poly-methacrylic acid, polyacrylamide (repeating units (—CH2CHCONH2-)n), polyacrylic acid, polyanionic cellulose, polyethylene glycol, polypropylene glycols, polyvinyl ether polymers, polyvinylpyrrolidones, sodium acrylate polymer, sodium carrageenan, sodium alginate, alginic acid, and xanthan gum. The amount of the one or more rheology modifying polymers may range, for example in a dilutable liquid formulation, from about 0.1% to about 50%, from about 0.5% to about 40%, from about 1% to about 30%, from about 1% to about 20%, from about 1% to about 15%, from about 2% to about 15%, from about 2% to about 10%, or any sub-ranges of the aforementioned ranges by weight in the composition. Further nonlimiting examples of the amount of the one or more rheology modifying polymers include about 0.1%, about 0.2%, about 0.5%, about 1%, about 1.5%, about 2%, about 5%, about 10%, about 15%, about 20%, about 25%, about 30%, about 40%, and about 50% by weight in the composition. For a two-component powdered version or water dispersible granule (WDG) formulation, the rheology modifier(s) may range from it would be 20-100%, 30-99%, 40-95%, 50-90%, 60-80% or 70-90% by weight, and a dispersant if present, may range from 10-80%, 20-40%, 20-30% or 10-50% by weight.

The dispersant allows for higher concentrations of the rheology modifying polymers with more uniform distribution in the composition. The ratio between the one or more rheology modifying polymers and the one or more dispersants in some embodiments range from about 2:1 to about 1:5, from about 1:1 to about 1:4, from about 1:1 to about 1:3, from about 1:1 to about 1:2. Nonlimiting examples of the ratio between the one or more rheology modifying polymers and the one or more dispersants include about 10:1, about 9:1, about 8:1, about 7:1, about 6:1, about 5:1, about 4:1, about 3:1, about 2:1, about 1:1, about 1:2, about 1:3, about 2:3, about 1:4, and about 1:5.

In some embodiments, the one or more rheology modifying polymers are selected from sodium alginate, carboxymethylcellulose, cellulose gum, hydroxypropylmethylcellulose, methylcellulose, microcrystalline cellulose, sodium carrageenan, and xanthan gum.

In some embodiments, at least 40%, at least 50%, at least 60%, at least 70%, at least 80%, at least 90%, at least 95%, at least 98%, at least 99%, or substantially all by weight of the one or more rheology modifying polymers is microcrystalline cellulose. In some embodiments, the microcrystalline cellulose has an average particle size ranging from 10-500, 10-400, 20-200, 20-100, 20-80, 20-60, 40-80, or 40-50 micrometers.

Microcrystalline cellulose may be obtained from any source, including, for example, wood pulp [such as bleached sulfite and sulfate pulps], corn husks, bagasse, straw, cotton, cotton linters, flax, hemp, ramie, seaweed, cellulose, fermented cellulose, bleached softwood kraft pulps, bleached hardwood kraft pulps, bleached *Eucalyptus* kraft pulps, paper pulps, fluff pulps, dissolving pulps, and bleached non-wood cellulosic pulps.

In some embodiments, the microcrystalline cellulose or the formulation containing microcrystalline cellulose is in a colloidal form. "Colloid" and "colloidal" are used to define particles that may be suspended in a mixture. As known to those of ordinary skill in the art, colloidal particles are of a certain average particle size, for example, on the order of about 0.1 to 10 microns. The colloidal particles described herein may be of any suitable particles size, provided that they are able to form colloidal suspensions.

In some embodiments, the one or more rheology modifying polymers comprise or consist of carboxymethyl cellulose (CMC). In some embodiments, the one or more rheology modifying polymers include a combination of CMC and MCC. In some embodiments, the CMC has a purity of at least 80%, at least 85%, at least 90%, at least 95%, at least 99%, at least 99.5%. In some embodiments, the CMC has molecular weight ranging from about 50 k to about 3,000 k, from about 100 k to about 2,000 k, from about 100 k to about 500 k, from about 100 k to about 400 k, from about 500 k to about 10,000 k, from about 500 k to about 800 k, from about 500 k to about 750 k, from about 100 k to about 700 k, from about 1,000 k to about 2,000 k, from about 1,000 k to about 1,500 k, or from about 1,000 k to about 1,200 k Dalton. In some embodiments, the CMC has a substitution rate ranging from about 0.5 to about 0.85%, from about 0.55 to about 0.85%, from about 0.60 to about 0.80%, from about 0.65 to about 0.75%, from about 0.75 to about 0.85%, or from about 0.85 to about 0.95%.

Carboxymethylcellulose can be alkali metal carboxymethylcellulose, for instance, sodium, potassium, or ammonium CMC. The CMC is characterized by, inter alia, the degree of substitution (DS) that is present. The degree of substitution represents the average number of hydroxyl groups substituted per anhydroglucose unit. For example, in CMC, each anhydroglucose unit contains three hydroxyl groups, which gives CMC a maximum theoretical DS of 3.0. Two commercially available carboxymethylcelluloses are AQUALON®7LF (low viscosity) and AQUALON®7MF (medium viscosity), both with a DS of 0.7, which is an average of 7 carboxymethyl groups per 10 anhydroglucose units (Ashland, Inc., Wilmington, Del., USA). A high DS, medium viscosity CMC is 12M8F (Ashland). Another high DS, medium viscosity CMC is 12M31P (Ashland). A high DS, high viscosity CMC is 9H7F CMC (Ashland). An additional CMC is DrisPac CMC (Ashland). In some embodiments, the carboxymethylcelluloses have two ranges of degree of substitution. The first carboxymethylcellulose has a degree of substitution of about 0.45 to about 0.85. In some embodiments, the first carboxymethylcellulose has a degree of substitution of 0.45 to 0.80. In still other embodiments, the first carboxymethylcellulose has a degree of substitution of about 0.7. The second carboxymethylcellulose has a degree of substitution of 0.9 to 1.5. Still, in other embodiments, the second carboxymethylcellulose has a degree of substitution of 0.9 to 1.2. The first and second carboxymethylcelluloses contemplated for use in the present methods are respectively of low and high degrees of substitution and varying levels of viscosity.

In some embodiments, a combination containing CMC and MCC is a colloidal formulation. In some embodiments, the quantities of MCC and carboxymethylcellulose incorporated into the formulation are such that the weight ratio of MCC:carboxymethylcellulose is about 50:50 to about 95:5, respectively. In some embodiments, the weight ratio of MCC:CMC ranges from about 95:5 to about 70:30, respectively. In some embodiments, the weight ratio is 85:15.

The combination containing CMC and MCC can be prepared by various means. In some embodiments, the preparation includes mixing a first water-soluble carboxymethylcellulose having a low DS with microcrystalline cellulose wetcake, wherein the weight ratio of the microcrystalline cellulose to the carboxymethylcellulose is about 50:50 to about 95:5. The moist mixture is extruded to effect intimate mixing among the components. A second water-soluble carboxymethylcellulose having a high DS is blended into the colloidal MCC:CMC extrudate. Additional procedures for preparing the combination includes those disclosed in U.S. Pat. No. 10,299,501, the entire disclosure of which is hereby incorporated by reference.

In some embodiments, at least 40%, at least 50%, at least 60%, at least 70%, at least 80%, at least 90%, at least 95%, at least 98%, at least 99%, or substantially all by weight of the one or more rheology modifying polymers is xanthan gum. Degree of branching (DB) is expressed as the ratio of branch points to the total number of glucose residues in the main chain. In some embodiments, the xanthan gum has a degree of branching less than 30%, less than 25%, less than 20%, less than 15%, less than 10%, less than 5%, less than 2% or less than 1%.

In some embodiments, at least 40%, at least 50%, at least 60%, at least 70%, at least 80%, at least 90%, at least 95%, at least 98%, at least 99%, or substantially all by weight of the one or more rheology modifying polymers is sodium alginate. In some embodiments, the sodium alginate has a molecular weight ranging from about 40 k to about 350 k, from about 40 k to about 330 k, from about 40 k to about 200 k, from about 200 k to about 270 k, from about 270 k to about 330 k, from about 270 k to about 350 k, from about 330 k to about 400 k Daltons.

Nonlimiting examples of dispersants include acetylenic diol surfactant, acrylic copolymer, ethylenediaminetetraacetic acid, ethylene oxide-propylene oxide co-polymer, lignin sulfonate, neutral sodium salt of a condensed arylsulfonic acid, polyethylene oxide, polycarboxylate dispersant, polysiloxane surfactant, polyvinyl pyrrolidone, sodium dioctyl sulfosuccinate, sodium dodecyl benzene sulfonate, sodium hexametaphosphate, sodium naphthalene sulfonate formaldehyde, styrene acrylic co-polymer, and styrene acrylic polymer. The one or more dispersants in some embodiments range from about 0.1% to about 40%, from about 0.5% to about 35%, from about 1% to about 30%, from about 1% to about 20%, from about 5% to about 10%, or any sub-ranges of the aforementioned ranges by weight in the composition. In some embodiments, the composition includes a naphthalene condensate. Naphthalene condensate refers to a group of chemical compounds that are derived from the condensation of naphthalene, a polycyclic aromatic hydrocarbon. One common form of naphthalene condensate is the sodium salt of naphthalene sulfonate condensate. These compounds are produced through the sulfonation and condensation processes, resulting in water-soluble salts with dispersant or surfactant properties.

In some embodiments, the dispersant comprises or consists essentially of sodium lignosulfonate. In some embodiments, the sodium lignosulfonate has a degree of sulfonation ranging from about 2% to about 5%, from about 2.5% to about 4.5%, or from about 3% to about 4%. Site of the sulfonic acid group for lignosulfonates can be aromatic, aliphatic, or a hybrid. The preferred is an aliphatic side chain. Sodium lignosulfonates can be prepared per known chemical procedure or purchased from commercial source (e.g. sodium lignosulfonate dispersant with CAS #8061-51-6). The typical average molecular weight of sodium lignosulfonate products is from 2,000-26,000. In some embodiments the average molecular weight of sodium lignosulfonate ranges from 1,000-5,000, 2,000-5,000, 2,000-4,000, 2,000-3,000, or 3,000-4,000 Daltons. The $Na_2SO_3$ content may range from 0-20%, 4-16%, 10-20%, 15-20%, 16-18%, 15-17%, or 15-16% by weight. In some embodiments, $Na_2SO_3$ content is about 15%, about 16%, about 17% or 18%.

In some embodiments, the amount of water ranges from about 40% to about 99.9%, from about 50% to about 98%, from about 50% to about 95%, or from about 50% to about 90% by weight in the composition or formulation. In solid formulations such as powder and WDG formulations, the amount of water would be close to zero. Such solid formulations can be diluted with water before application.

The composition may include one or more components such as thickener, gelling agent, protein, glue or resin, biopolymer, wetting agent, buffer, anti-foam agent, and soil amendments. Each of these components independently may range from about 0.1% to about 50%, from about 0.5% to about 40%, from about 1% to about 30%, from about 1% to about 20%, from about 1% to about 15%, from about 2% to about 15%, from about 2% to about 10%, or any sub-ranges of the aforementioned ranges by weight in the composition. Further nonlimiting examples of the amount of each individual component include about 0.1%, about 0.2%, about 0.5%, about 1%, about 1.5%, about 2%, about 5%, about 10%, about 15%, about 20%, about 25%, about 30%, about 40%, and about 50% by weight in the composition.

Nonlimiting examples of thickeners include arrowroot, beta-glucans, starch (carboxymethyl starch, cornstarch, Katakuri starch, or potato starch), dextrin, glycerin, sago, sorbitol, tapioca flour, urea, and flours (almond, tapioca, wheat, etc).

Nonlimiting examples of gelling agents include acacia gums, agar, alginic acid, alginate, amylopectin, carnitine, chitosan, dextran sulfate, gelatin, gellan gum, guar hydroxypropyl triammonium chloride, gum tragacanth, hectorite, hyaluronic acid, hydrogenated silica, karaya gum, kelp, locust bean gum, natto gum, pectin, *Plantago*, sclera rhodium gum, scleroglucans, sodium carboxymethyl dextran, sodium metasilicate, and sodium silicate.

Nonlimiting examples of proteins include albumin, casein, collagen, gliadin, hordein, prolamine, and zein.

Nonlimiting examples of glues or resins include casein, caryophyllene, delta-cadinene, glycerol esters of gum, hydrogenated hydrocarbon resin, lignin, limonene, longifolene, mucilage, pinene, polyvinyl acetate, polyvinyl alcohol, sabinene, sesquiterpene, terpene-phenol resin, and terpinolene.

Nonlimiting examples of biopolymers include aggrecan, beta glycan, biglycan, chondroitin sulfate, decorin, dermatan sulfate, fecula, fibromodulin, glycosaminoglycan, heparin sulfate, keratin sulfate, perlecan, prolamine, and proteoglycan.

Nonlimiting examples of soil amendments selected from the group consisting of include clay (need specifics on the subtypes), diatomaceous earth, profile porous ceramics, and zeolite.

Nonlimiting examples of anti-foaming agents include silicone-based anti-foam agents, mineral oil-based anti-foam agents, fatty acid esters, ethylene oxide-propylene oxide copolymers, alkyl phosphate esters, alkylamines, organosilicon compounds, and glycerol esters.

In some embodiments, the components of the composition are selected in amounts so that upon application, the compressive strength or firmness and/or shear strength of the soil or sand surface improves by at least 10%, at least 20%, at least 30%, at least 40%, at least 50%, at least 80%, at least 100%, at least 200%, at least 300%, or at least 400%, or at least 500% in comparison with a field without being applied the composition. The improvement may take place within 1 day, within 2 days, within 3 days, within 5 days, within 7 days, or within 10 days after application. The improved surface condition may last for 1-60 days or longer.

The composition disclosed herein may be in the form of a liquid formulation, granules, pellets, or powder.

Further examples of the composition include the following:
- a. 2.5-12.5% acrylic polymers, 2.5-12.5% naphthalene condensate, 75-95% water
- b. 1-10% cellulose gum, 1-10% naphthalene condensate, 80-98% water
- c. 3-15% guar gum, 3-15% naphthalene condensate, 70-94% water
- d. 5-20% guar gum, 5-20% naphthalene condensate, 60-90% water
- e. 10-25% microcrystalline cellulose, 10-25% naphthalene condensate, 50-80% water
- f. 1-10% polyacrylamide, 1-10% naphthalene condensate, 80-98% water
- g. 2.5-12.5% polyvinyl ether polymers, 2.5-12.5% naphthalene condensate, 75-95% water
- h. 2.5-12.5% acrylic polymers, 2.5-12.5% anionic styrene acrylic co-polymer, 75-95% water
- i. 1-10% cellulose gum, 1-10% anionic styrene acrylic co-polymer, 80-98% water
- j. 3-15% guar gum, 3-15% anionic styrene acrylic co-polymer, 70-94% water
- k. 5-20% guar gum, 5-20% anionic styrene acrylic co-polymer, 60-90% water
- l. 10-25% microcrystalline cellulose, 10-25% anionic styrene acrylic co-polymer, 50-80% water
- m. 1-10% polyacrylamide, 1-10% anionic styrene acrylic co-polymer, 80-98% water
- n. 2.5-12.5% polyvinyl ether polymers, 2.5-12.5% anionic styrene acrylic co-polymer, 75-95% water
- o. 2.5-12.5% acrylic polymers, 2.5-12.5% lignin sulfonate, 75-95% water
- p. 1-10% cellulose gum, 1-10% lignin sulfonate, 80-98% water
- q. 3-15% guar gum, 3-15% lignin sulfonate, 70-94% water
- r. 5-20% guar gum, 5-20% lignin sulfonate, 60-90% water
- s. 10-25% microcrystalline cellulose, 10-25% lignin sulfonate, 50-80% water
- t. 1-10% polyacrylamide, 1-10% lignin sulfonate, 80-98% water
- u. 2.5-12.5% polyvinyl ether polymers, 2.5-12.5% lignin sulfonate, 75-95%

The composition can be prepared in any suitable sequence of mixing the components. In some embodiments, the dispersant (if present) is mixed into water before more rheology modifying polymer is added.

An aspect of this disclosure provides a method of optimizing or improving turf, soil, or sand surface of a field by applying the composition or formulation disclosed herein to the field. Nonlimiting examples of fields include golf course, a sports turf field, a sand bunker, or any playing field having a turf, soil, or sand surface. The composition can be mixed with soil or sand by any suitable means. In some embodiments, the composition is sprayed onto the field. In some embodiments, the composition is applied at a temperature above freezing point.

Sand traps, also known as sand bunkers, are strategically placed on golf courses to add an element of challenge to the game. Golf is a sport that values accuracy and precision, and sand traps create hazards that golfers must avoid. Landing a golf ball in a bunker can result in a more difficult shot, potentially leading to higher scores. Good bunkers sands are dependent on particle size distribution, angularity, water retention, and drainage characteristics resulting in bunkers that reduce fried egg lies, improve player traction, reduce washout after heavy rains, limit wind erosion, and improve surface stability. However, not all golf courses have access to premium bunker sand because of limited access or affordability resulting in wide variability in the quality of sand used in golf course bunkers from site to site.

In some embodiments, the formulation or composition disclosed herein is a naturally derived, sustainably sourced, proprietary biopolymer designed to form microscopic connections between sand particles to improve playability and reduce maintenance requirements for sand bunkers on golf courses. As bunker sand quality varies dramatically from one course to another, the formulation's ability to increase bunker sand firmness improves playability by preventing fried egg lies and improving traction at the bunker surface. Bunker erosion from blowing wind or running water causes significant disruption to the playability of sand bunkers and requires extensive labor to return bunkers to their proper form. The formulation's ability to hold sand particles together allows it to reduce wind and rain erosion in sand bunkers. In doing so, the formulation has the following benefits that are of interest to golf course superintendents, including increasing firmness of golf course sand bunkers to improve playability, limiting fried egg lies, improving player traction on bunker surfaces, easing erosion from wind and rain events, enhancing surface stability of golf course bunkers, reducing bunker maintenance requirements, and improving dust control of fine sand and soil particles.

The formulation is suitable for application to sand bunker surfaces on golf courses to improve playability and reduce bunker maintenance requirements, which result in numerous primary and secondary benefits to golf course superintendents as outlined below. Users have the flexibility to apply the product at rates based on the characteristics of their bunker sand and current playing conditions with application rates ranging from, for example, 1-50, 1-30, 5-25 or 5-15 gallons per 1000 ft$^2$ or 1-30 (e.g. 1, 2, 3, 4, 6, 10, 15, 20, 25, or 30) pounds of rheology modifier plus 1-30 (e.g. 1, 2, 3, 4, 6, 10, 15, 20, 25, or 30) pounds of dispersant per 1000 ft$^2$ and applications (e.g. spraying) occurring every 1-24, 1-12, 2-8, 2-6, or 3-12 months depending on performance.

In some embodiments, the method increases firmness of the sand surface of a sand bunker. In some embodiments, the amount of the one or more rheology modifying polymers is selected and the formulation is applied in a frequency so that the firmness, compressive force and/or shear force of the field or surface is increased by at least 2, at least 3, at least 4, at least 5, at least 6, at least 7, at least 8, at least 9, at least 10, at least 12, at least 15, at least 18, or at least 20 times in comparison with an untreated field or surface.

Besides improving the firmness and/or shear strength of the sand or soil surface, the method can also provide the added benefits of water retention, erosion control, and dust suppression. For instance, the composition disclosed herein can be applied to a field or surface to accomplish one or more of the following: reducing the frequency and severity of fried egg lies in golf course bunkers (e.g. by 10-40%); improving player traction on sand bunker surfaces (e.g. by 5-20%); reducing sand bunker erosion from wind and rain events (e.g. by 5-20%); reducing maintenance requirements on golf course bunkers (e.g. by 10-25%); increasing water retention in other soil types, turf, engineered soils, etc (e.g. by 5-10%); improving firmness (compressive and shear stress) in other soil types, turf, engineered soils, etc (e.g. by 5-200%); improving player traction on natural and artificial turf surfaces (e.g. by 5-20%); reducing dust production on dirt and sand roads, construction sites, mining operations, cart paths, etc (e.g. by 10-75%); reducing leaching of soil- and turf-applied herbicides and chemicals (e.g. by 10-50%). In some embodiments, the ingredients of the composition/formulation and their amounts and the frequency of application are selected so that one or more of the aforementioned parameters (e.g. firmness, water retention, erosion control, dust suppression, frequency and severity of fried egg lies, leaching of soil- and turf-applied herbicides and chemicals, etc) are increased or decreased by about 2%, 5%, 10%, 15%, 20%, 25%, 40%, 50%, 60%, 80%, 100%, 150%, 200%, 300% or any range between any two of these percentages in comparison with an untreated field or surface over the same period of time (e.g. 1, 2, 3, 5, 7, 10, 15, 20, or 30 days, or 2, 3, 4, 5, 6, 8, 10, or 12 months). In some embodiments, the ingredients of the composition/formulation is applied so that compressive force and/or shear force of the surface is increased by at least 1.5, at least 2, at least 2.5, at least 3, at least 4, at least 5, at least 6, at least 7, at least 8, at least 9, or at least 10 times in comparison with an untreated surface.

In some embodiments, the amount of the one or more rheology modifying polymers is selected and the formulation is applied in a frequency so that volumetric water content of the field or surface (e.g. soil or sand bunker) is increased by at least 2, at least 3, at least 4, at least 5, at least 6, at least 7, at least 8, at least 9, at least 10, at least 12, at least 15, at least 18, or at least 20 times in comparison with an untreated field or surface.

EXAMPLES

Example 1

Liquid formulations: Liquid formulations are made of 2-25% rheology modifier, 2.5-20% dispersant, and 65-95.5% water. 80-100% of the Dispersant is added to the water first and mixed under low- or high-shear mixing for 5-10 minutes. 100% of the rheology modifier is added next and mixed under low- or high-shear mixing for 5-10 minutes. If needed, the remaining 0-20% of the Dispersant is added to the formulation and mixed for 5-10 minutes under low- or high-shear mixing.

WDG formulations: The rheology modifier is mixed at 50-90% with 10-40% powdered dispersant, 0-10% methylcellulose, 0-5% croscarmellose, 0-5% wetting agent, 0-20% clay or silica, 0-2.5% anti-foam agent, and 0-5% buffer 0-5%. The powder mixture is added in a ratio of 1:1 to 1:5 with water and mixed/kneaded into an extrudable dough. The dough is extruded to form pellets which are dried to a final moisture content of 0-5%, milled, and screened to achieve the appropriate particle size. The WDG formulation can be added to water in a WDG to water ratio of 1:10 to 1:50 to form a sprayable mixture.

Wettable Powder formulations: The ratio to make a wettable powder formulation is to mix 1-5 parts rheology modifier: 0.5-3 parts dispersant: 0-1 part methylcellulose: 0-1 part sodium croscarmellose: 0-1 part wetting agent 0-1 parts clay or silica. The wettable powder formulation can be added to water in a powder to water ratio of 1:10 to 1:30 to form a sprayable mixture.

Powder formulations: The ratio to make a sprayable tank-mix is to mix 10-40 parts water: 1-5 parts rheology modifier: 0.5-3 parts dispersant. The dispersant is added to the water in the spray tank first and dissolved using in-tank agitation. Once the dispersant is dissolved in the tank mix, the rheology modifier is added to the tank until evenly suspended using in-tank agitation.

Pellet formulations: Pellets are made by mixing a ratio of melted urea prill with water of 1:1. After the heated mixture of urea and water are fully mixed, the rheology modifier is then added in a ratio of water-urea mix to rheology modifier of 1:1 to 1:2. This mixture is then poured into pellet molds and allowed to solidify in a cool, humid curing environment. Pellets can be added to hand-held spray guns to hand water the product into areas of concern or added to a spray take in a water:pellet ratio of 1:1 to 1:5.

Example 2

The following liquid formulations can be prepared according to the procedures disclosed herein.
 a. 2.5-12.5% acrylic polymers, 2.5-12.5% naphthalene condensate, 75-95% water
 b. 1-10% cellulose gum, 1-10% naphthalene condensate, 80-98% water
 c. 3-15% guar gum, 3-15% naphthalene condensate, 70-94% water
 d. 5-20% guar gum, 5-20% naphthalene condensate, 60-90% water
 e. 2-20% hydroxyethylcellulose, 2.5-12.5% naphthalene condensate, 75-95% water
 f. 5-25% hydroxymethylcellulose, 5-20% naphthalene condensate, 60-90% water
 g. 1-15% hydroxy-propyl methylcellulose, 1-15% naphthalene condensate, 70-98% water
 h. 2-20% carboxymethylcellulose, 2-20% naphthalene condensate, 60-97% water
 i. 1-15% hydroxypropylcellulose, 2.5-12.5% naphthalene condensate, 75-95% water
 j. 3-15% ethylmethylcellulose, 1-15% naphthalene condensate, 70-98% water
 k. 2-25% xanthan gum, 5-20% naphthalene condensate, 60-90% water
 l. 1-15% sodium alginate, 1-15% naphthalene condensate, 70-98% water
 m. 2-20% alginic acid, 2.5-12.5% naphthalene condensate, 75-95% water
 n. 1-15% dextran, 5-20% naphthalene condensate, 60-90% water
 o. 10-25% microcrystalline cellulose, 10-25% naphthalene condensate, 50-80% water
 p. 1-10% polyacrylamide, 1-10% naphthalene condensate, 80-98% water
 q. 2.5-12.5% polyvinyl ether polymers, 2.5-12.5% naphthalene condensate, 75-95% water
 r. 2.5-12.5% acrylic polymers, 2.5-12.5% anionic styrene acrylic co-polymer, 75-95% water
 s. 1-10% cellulose gum, 1-10% anionic styrene acrylic co-polymer, 80-98% water
 t. 3-15% guar gum, 3-15% anionic styrene acrylic co-polymer, 70-94% water
 u. 5-20% guar gum, 5-20% anionic styrene acrylic co-polymer, 60-90% water
 v. 2-20% hydroxyethylcellulose, 2.5-12.5% anionic styrene acrylic co-polymer, 62.5-95.5% water
 w. 5-25% hydroxymethylcellulose, 1-10% anionic styrene acrylic co-polymer, 65-94% water
 x. 1-15% hydroxy-propyl methylcellulose, 5-20% anionic styrene acrylic co-polymer, 65-94% water
 y. 2-20% carboxymethylcellulose, 1-10% anionic styrene acrylic co-polymer, 70-97% water
 z. 1-15% hydroxypropylcellulose, 2.5-12.5% anionic styrene acrylic co-polymer, 72.5-96.5% water
 aa. 3-15% ethylmethylcellulose, 1-10% anionic styrene acrylic co-polymer, 75-96% water
 bb. 2-25% xanthan gum, 1-10% anionic styrene acrylic co-polymer, 65-97% water
 cc. 1-15% sodium alginate, 5-20% anionic styrene acrylic co-polymer, 65-94% water
 dd. 2-20% alginic acid, 2.5-12.5% anionic styrene acrylic co-polymer, 67.5-95.5% water
 ee. 1-15% dextran, 5-20% anionic styrene acrylic co-polymer, 65-94% water
 ff. 10-25% microcrystalline cellulose, 10-25% anionic styrene acrylic co-polymer, 50-80% water
 gg. 1-10% polyacrylamide, 1-10% anionic styrene acrylic co-polymer, 80-98% water
 hh. 2.5-12.5% polyvinyl ether polymers, 2.5-12.5% anionic styrene acrylic co-polymer, 75-95% water
 ii. 2.5-12.5% acrylic polymers, 2.5-12.5% lignin sulfonate, 75-95% water
 jj. 1-10% cellulose gum, 1-10% lignin sulfonate, 80-98% water
 kk. 3-15% guar gum, 3-15% lignin sulfonate, 70-94% water
 ll. 5-20% guar gum, 5-20% lignin sulfonate, 60-90% water
 mm. 2-20% hydroxyethylcellulose, 1-10% lignin sulfonate, 70-97% water
 nn. 5-25% hydroxymethylcellulose, 2.5-12.5% lignin sulfonate, 62.5-92.5% water
 oo. 1-15% hydroxy-propyl methylcellulose, 1-10% lignin sulfonate, 75-98% water
 pp. 2-20% carboxymethylcellulose, 5-20% lignin sulfonate, 60-93% water
 qq. 5-25% hydroxypropylcellulose, 2.5-12.5% lignin sulfonate, 62.5-92.5% water
 rr. 1-15% ethylmethylcellulose, 1-10% lignin sulfonate, 75-98% water
 ss. 2-25% xanthan gum, 5-20% lignin sulfonate, 55-93% water
 tt. 1-15% sodium alginate, 2.5-12.5% lignin sulfonate, 72.5-96.5% water
 uu. 2-20% alginic acid, 5-20% lignin sulfonate, 60-93% water
 vv. 1-15% dextran, 1-10% lignin sulfonate, 75-98% water
 ww. 10-25% microcrystalline cellulose, 10-25% lignin sulfonate, 50-80% water
 xx. 1-10% polyacrylamide, 1-10% lignin sulfonate, 80-98% water
 yy. 2.5-12.5% polyvinyl ether polymers, 2.5-12.5% lignin sulfonate, 75-95%

Example 3

Examples of water dispersible granule formulations are shown below.
 a. 50-90% acrylic polymers, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
 b. 50-90% cellulose gum, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5% c. 50-90% guar gum, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
d. 50-90% hydroxyethylcellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
e. 50-90% hydroxymethylcellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
f. 50-90% hydroxy-propyl methylcellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
g. 50-90% carboxymethylcellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
h. 50-90% hydroxypropylcellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
i. 50-90% ethylmethylcellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
j. 50-90% xanthan gum, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
k. 50-90% sodium alginate, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
l. 50-90% alginic acid, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
m. 50-90% dextran, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
n. 50-90% microcrystalline cellulose, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
o. 50-90% polyacrylamide, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
p. 50-90% polyvinyl ether polymers, 10-40% naphthalene condensate, methylcellulose 0-10%, sodium croscarmellose 0-5%, wetting agent 0-5%, clay or silica 0-20%, anti-foam agent 0-2.5%, buffer 0-5%, water content after drying 0-5%
q. 50-90% acrylic polymers, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
r. 50-90% cellulose gum, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
s. 50-90% guar gum, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
t. 50-90% hydroxyethylcellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
u. 50-90% hydroxymethylcellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
v. 50-90% hydroxy-propyl methylcellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
w. 50-90% carboxymethylcellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
x. 50-90% hydroxypropylcellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
y. 50-90% ethylmethylcellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
z. 50-90% xanthan gum, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
aa. 50-90% sodium alginate, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
bb. 50-90% alginic acid, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
cc. 50-90% dextran, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
dd. 50-90% microcrystalline cellulose, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
ee. 50-90% polyacrylamide, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
ff. 50-90% polyvinyl ether polymers, 10-40% anionic styrene acrylic co-polymer, methylcellulose 0-10%, sodium croscarmellose 0-5%, wetting agent 0-5%, clay or silica 0-20%, anti-foam agent 0-2.5%, buffer 0-5%, water content after drying 0-5%
gg. 50-90% acrylic polymers, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
hh. 50-90% cellulose gum, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
ii. 50-90% guar gum, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
jj. 50-90% hydroxyethylcellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
kk. 50-90% hydroxymethylcellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
ll. 50-90% hydroxy-propyl methylcellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
mm. 50-90% carboxymethylcellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
nn. 50-90% hydroxypropylcellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
oo. 50-90% ethylmethylcellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
pp. 50-90% xanthan gum, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
qq. 50-90% sodium alginate, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
rr. 50-90% alginic acid, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
ss. 50-90% dextran, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
tt. 50-90% microcrystalline cellulose, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
uu. 50-90% polyacrylamide, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%
vv. 50-90% polyvinyl ether polymers, 10-40% lignin sulfonate, methylcellulose 0-10%, sodium croscarmellose 0-5%, wetting agent 0-5%, clay or silica 0-20%, anti-foam agent 0-2.5%, buffer 0-5%, water content after drying 0-5%

Example 4

The following examples illustrate wettable powder formulations.
a. 50-90% acrylic polymers, 10-40% naphthalene condensate, methylcellulose 0-10%, sodium croscarmellose 0-5%, wetting agent 0-5%, clay or silica 0-20%
b. 50-90% cellulose gum, 10-40% naphthalene condensate, methylcellulose 0-10%, sodium croscarmellose 0-5%, wetting agent 0-5%, clay or silica 0-20%
c. 50-90% guar gum, 10-40% naphthalene condensate, methylcellulose 0-10%, sodium croscarmellose 0-5%, wetting agent 0-5%, clay or silica 0-20%
d. 50-90% hydroxyethylcellulose, 10-40% naphthalene condensate, methylcellulose 0-10%, sodium croscarmellose 0-5%, wetting agent 0-5%, clay or silica 0-20%
e. 50-90% hydroxymethylcellulose, 10-40% naphthalene condensate, methylcellulose 0-10%, sodium croscarmellose 0-5%, wetting agent 0-5%, clay or silica 0-20%
f. 50-90% hydroxy-propyl methylcellulose, 10-40% naphthalene condensate, methylcellulose 0-10%, sodium croscarmellose 0-5%, wetting agent 0-5%, clay or silica 0-20%
g. 50-90% carboxymethylcellulose, 10-40% naphthalene condensate, methylcellulose 0-10%, sodium croscarmellose 0-5%, wetting agent 0-5%, clay or silica 0-20%
h. 50-90% hydroxypropylcellulose, 10-40% naphthalene condensate, methylcellulose 0-10%, sodium croscarmellose 0-5%, wetting agent 0-5%, clay or silica 0-20%
i. 50-90% ethylmethylcellulose, 10-40% naphthalene condensate, methylcellulose 0-10%, sodium croscarmellose 0-5%, wetting agent 0-5%, clay or silica 0-20%
j. 50-90% xanthan gum, 10-40% naphthalene condensate, methylcellulose 0-10%, sodium croscarmellose 0-5%, wetting agent 0-5%, clay or silica 0-20%
k. 50-90% sodium alginate, 10-40% naphthalene condensate, methylcellulose 0-10%, sodium croscarmellose 0-5%, wetting agent 0-5%, clay or silica 0-20% l. 50-90% alginic acid, 10-40% naphthalene condensate, methylcellulose 0-10%, sodium croscarmellose 0-5%, wetting agent 0-5%, clay or silica 0-20%
m. 50-90% dextran, 10-40% naphthalene condensate, methylcellulose 0-10%, sodium croscarmellose 0-5%, wetting agent 0-5%, clay or silica 0-20%
n. 50-90% microcrystalline cellulose, 10-40% naphthalene condensate, methylcellulose 0-10%, sodium croscarmellose 0-5%, wetting agent 0-5%, clay or silica 0-20%
o. 50-90% polyacrylamide, 10-40% naphthalene condensate, methylcellulose 0-10%, sodium croscarmellose 0-5%, wetting agent 0-5%, clay or silica 0-20%
p. 50-90% polyvinyl ether polymers, 10-40% naphthalene condensate, methylcellulose 0-10%, sodium croscarmellose 0-5%, wetting agent 0-5%, clay or silica 0-20%
q. 50-90% acrylic polymers, 10-40% anionic styrene acrylic co-polymer, methylcellulose 0-10%, sodium croscarmellose 0-5%, wetting agent 0-5%, clay or silica 0-20%
r. 50-90% cellulose gum, 10-40% anionic styrene acrylic co-polymer, methylcellulose 0-10%, sodium croscarmellose 0-5%, wetting agent 0-5%, clay or silica 0-20%
s. 50-90% guar gum, 10-40% anionic styrene acrylic co-polymer, methylcellulose 0-10%, sodium croscarmellose 0-5%, wetting agent 0-5%, clay or silica 0-20%
t. 50-90% hydroxyethylcellulose, 10-40% anionic styrene acrylic co-polymer, methylcellulose 0-10%, sodium croscarmellose 0-5%, wetting agent 0-5%, clay or silica 0-20%
u. 50-90% hydroxymethylcellulose, 10-40% anionic styrene acrylic co-polymer, methylcellulose 0-10%, sodium croscarmellose 0-5%, wetting agent 0-5%, clay or silica 0-20%
v. 50-90% hydroxy-propyl methylcellulose, 10-40% anionic styrene acrylic co-polymer, methylcellulose 0-10%, sodium croscarmellose 0-5%, wetting agent 0-5%, clay or silica 0-20%
w. 50-90% carboxymethylcellulose, 10-40% anionic styrene acrylic co-polymer, methylcellulose 0-10%, sodium croscarmellose 0-5%, wetting agent 0-5%, clay or silica 0-20% x. 50-90% hydroxypropylcellulose, 10-40% anionic styrene acrylic co-polymer, methylcellulose 0-10%, sodium croscarmellose 0-5%, wetting agent 0-5%, clay or silica 0-20% y. 50-90% ethylmethylcellulose, 10-40% anionic styrene acrylic co-polymer, methylcellulose 0-10%, sodium croscarmellose 0-5%, wetting agent 0-5%, clay or silica 0-20% z. 50-90% xanthan gum, 10-40% anionic styrene acrylic co-polymer, methylcellulose 0-10%, sodium croscarmellose 0-5%, wetting agent 0-5%, clay or silica 0-20% aa. 50-90% sodium alginate, 10-40% anionic styrene acrylic co-polymer, methylcellulose 0-10%, sodium croscarmellose 0-5%, wetting agent 0-5%, clay or silica 0-20% bb. 50-90% alginic acid, 10-40% anionic styrene acrylic co-polymer, methylcellulose 0-10%, sodium croscarmellose 0-5%, wetting agent 0-5%, clay or silica 0-20% cc. 50-90% dextran, 10-40% anionic styrene acrylic co-polymer, methylcellulose 0-10%, sodium croscarmellose 0-5%, wetting agent 0-5%, clay or silica 0-20% dd. 50-90% microcrystalline cellulose, 10-40% anionic styrene acrylic co-polymer, methylcellulose 0-10%, sodium croscarmellose 0-5%, wetting agent 0-5%, clay or silica 0-20% ee. 50-90% polyacrylamide, 10-40% anionic styrene acrylic co-polymer, methylcellulose 0-10%, sodium croscarmellose 0-5%, wetting agent 0-5%, clay or silica 0-20% ff. 50-90% polyvinyl ether polymers, 10-40% anionic styrene acrylic co-polymer, methylcellulose 0-10%, sodium croscarmellose 0-5%, wetting agent 0-5%, clay or silica 0-20% gg. 50-90% acrylic polymers, 10-40% lignin sulfonate, methylcellulose 0-10%, sodium croscarmellose 0-5%, wetting agent 0-5%, clay or silica 0-20% hh. 50-90% cellulose gum, 10-40% lignin sulfonate, methylcellulose 0-10%, sodium croscarmellose 0-5%, wetting agent 0-5%, clay or silica 0-20% ii. 50-90% guar gum, 10-40% lignin sulfonate, methylcellulose 0-10%, sodium croscarmellose 0-5%, wetting agent 0-5%, clay or silica 0-20% jj. 50-90% hydroxyethylcellulose, 10-40% lignin sulfonate, methylcellulose 0-10%, sodium croscarmellose 0-5%, wetting agent 0-5%, clay or silica 0-20% kk. 50-90% hydroxymethylcellulose, 10-40% lignin sulfonate, methylcellulose 0-10%, sodium croscarmellose 0-5%, wetting agent 0-5%, clay or silica 0-20% ll. 50-90% hydroxy-propyl methylcellulose, 10-40% lignin sulfonate, methylcellulose 0-10%, sodium croscarmellose 0-5%, wetting agent 0-5%, clay or silica 0-20% mm. 50-90% carboxymethylcellulose, 10-40% lignin sulfonate, methylcellulose 0-10%, sodium croscarmellose 0-5%, wetting agent 0-5%, clay or silica 0-20% nn. 50-90% hydroxypropylcellulose, 10-40% lignin sulfonate, methylcellulose 0-10%, sodium croscarmellose 0-5%, wetting agent 0-5%, clay or silica 0-20% oo. 50-90% ethylmethylcellulose, 10-40% lignin sulfonate, methylcellulose 0-10%, sodium croscarmellose 0-5%, wetting agent 0-5%, clay or silica 0-20% pp. 50-90% xanthan gum, 10-40% lignin sulfonate, methylcellulose 0-10%, sodium croscarmellose 0-5%, wetting agent 0-5%, clay or silica 0-20% qq. 50-90% sodium alginate, 10-40% lignin sulfonate, methylcellulose 0-10%, sodium croscarmellose 0-5%, wetting agent 0-5%, clay or silica 0-20% rr. 50-90% alginic acid, 10-40% lignin sulfonate, methylcellulose 0-10%, sodium croscarmellose 0-5%, wetting agent 0-5%, clay or silica 0-20% ss. 50-90% dextran, 10-40% lignin sulfonate, methylcellulose 0-10%, sodium croscarmellose 0-5%, wetting agent 0-5%, clay or silica 0-20% tt. 50-90% microcrystalline cellulose, 10-40% lignin sulfonate, methylcellulose 0-10%, sodium croscarmellose 0-5%, wetting agent 0-5%, clay or silica 0-20% uu. 50-90% polyacrylamide, 10-40% lignin sulfonate, methylcellulose 0-10%, sodium croscarmellose 0-5%, wetting agent 0-5%, clay or silica 0-20% vv. 50-90% polyvinyl ether polymers, 10-40% lignin sulfonate, methylcellulose 0-10%, sodium croscarmellose 0-5%, wetting agent 0-5%, clay or silica 0-20%

Example 5

The following examples illustrate powder applications with the dispersant added to water in a spray tank prior to adding the rheology modifier.

a. 50-90% acrylic polymers, 10-50% naphthalene condensate b. 45-85% cellulose gum, 15-55% naphthalene condensate c. 55-95% guar gum, 5-45% naphthalene condensate
d. 60-98% guar gum, 2-40% naphthalene condensate
e. 50-90% hydroxyethylcellulose, 10-50% naphthalene condensate
f. 55-95% hydroxymethylcellulose, 5-45% naphthalene condensate
g. 50-90% hydroxy-propyl methylcellulose, 10-50% naphthalene condensate
h. 45-85% carboxymethylcellulose, 15-55% naphthalene condensate
i. 60-98% hydroxypropylcellulose, 2-40% naphthalene condensate
j. 50-90% ethylmethylcellulose, 10-50% naphthalene condensate
k. 55-95% xanthan gum, 5-45% naphthalene condensate
l. 45-85% sodium alginate, 15-55% naphthalene condensate
m. 60-98% alginic acid, 2-40% naphthalene condensate
n. 55-95% dextran, 5-45% naphthalene condensate
o. 50-90% microcrystalline cellulose, 10-50% naphthalene condensate
p. 45-85% polyacrylamide, 15-55% naphthalene condensate
q. 55-95% polyvinyl ether polymers, 5-45% naphthalene condensate
r. 50-90% acrylic polymers, 10-50% anionic styrene acrylic co-polymer
s. 55-95% cellulose gum, 5-45% anionic styrene acrylic co-polymer
t. 45-85% guar gum, 15-55% anionic styrene acrylic co-polymer
u. 50-90% guar gum, 10-50% anionic styrene acrylic co-polymer
v. 45-85% hydroxyethylcellulose, 15-55% anionic styrene acrylic co-polymer
w. 60-98% hydroxymethylcellulose, 2-40% anionic styrene acrylic co-polymer
x. 50-90% hydroxy-propyl methylcellulose, 10-50% anionic styrene acrylic co-polymer
y. 55-95% carboxymethylcellulose, 5-45% anionic styrene acrylic co-polymer
z. 45-85% hydroxypropylcellulose, 15-55% anionic styrene acrylic co-polymer
aa. 50-90% ethylmethylcellulose, 10-50% anionic styrene acrylic co-polymer
bb. 60-98% xanthan gum, 2-40% anionic styrene acrylic co-polymer
cc. 50-90% sodium alginate, 10-50% anionic styrene acrylic co-polymer
dd. 45-85% alginic acid, 15-55% anionic styrene acrylic co-polymer
ee. 60-98% dextran, 2-40% anionic styrene acrylic co-polymer
ff. 55-95% microcrystalline cellulose, 5-45% anionic styrene acrylic co-polymer
gg. 50-90% polyacrylamide, 10-50% anionic styrene acrylic co-polymer
hh. 55-95% polyvinyl ether polymers, 5-45% anionic styrene acrylic co-polymer
ii. 60-98% acrylic polymers, 2-40% lignin sulfonate
jj. 50-90% cellulose gum, 10-50% lignin sulfonate
kk. 45-85% guar gum, 15-55% lignin sulfonate
ll. 50-90% guar gum, 10-50% lignin sulfonate
mm. 55-95% hydroxyethylcellulose, 5-45% lignin sulfonate
nn. 45-85% hydroxymethylcellulose, 15-55% lignin sulfonate
oo. 50-90% hydroxy-propyl methylcellulose, 10-50% lignin sulfonate
pp. 60-98% carboxymethylcellulose, 2-40% lignin sulfonate
qq. 55-95% hydroxypropylcellulose, 5-45% lignin sulfonate
rr. 45-85% ethylmethylcellulose, 15-55% lignin sulfonate
ss. 60-98% xanthan gum, 2-40% lignin sulfonate
tt. 50-90% sodium alginate, 10-50% lignin sulfonate
uu. 55-95% alginic acid, 5-45% lignin sulfonate
vv. 45-85% dextran, 15-55% lignin sulfonate
ww. 50-90% microcrystalline cellulose, 10-50% lignin sulfonate
xx. 55-95% polyacrylamide, 5-45% lignin sulfonate
yy. 45-85% polyvinyl ether polymers, 15-55% lignin sulfonate Example 6

The following examples illustrate pellet formulations dispersed by water.
a. 50-90% acrylic polymers, 10-40% urea, water 5-40%
b. 45-85% cellulose gum, 5-35% urea, water 10-50%
c. 55-95% guar gum, 2-40% urea, water 3-43%
d. 60-98% guar gum, 10-30% urea, water 2-30%
e. 50-90% hydroxyethylcellulose, 10-40% urea, water 5-40%
f. 55-95% hydroxymethylcellulose, 2-40% urea, water 3-43%
g. 50-90% hydroxy-propyl methylcellulose, 10-40% urea, water 5-40%
h. 45-85% carboxymethylcellulose, 5-35% urea, water 10-50%
i. 60-98% hydroxypropylcellulose, 10-30% urea, water 2-30%
j. 50-90% ethylmethylcellulose, 10-40% urea, water 5-40%
k. 55-95% xanthan gum, 2-40% urea, water 3-43%
l. 45-85% sodium alginate, 5-35% urea, water 10-50%
m. 60-98% alginic acid, 10-30% urea, water 2-30%
n. 55-95% dextran, 2-40% urea, water 3-43%
o. 50-90% microcrystalline cellulose, 10-40% urea, water 5-40%
p. 45-85% polyacrylamide, 5-35% urea, water 10-50%
q. 55-95% polyvinyl ether polymers, 2-40% urea, water 3-43%
r. 50-90% acrylic polymers, glycerin 10-50%
s. 55-95% cellulose gum, glycerin 5-45%
t. 45-85% guar gum, glycerin 15-55%
u. 50-90% guar gum, Glycerin 10-50%
v. 45-85% hydroxyethylcellulose, glycerin 15-55%
w. 60-98% hydroxymethylcellulose, 2-40% anionic styrene acrylic co-polymer
x. 50-90% hydroxy-propyl methylcellulose, glycerin 10-50%
y. 55-95% carboxymethylcellulose, glycerin 5-45%
z. 45-85% hydroxypropylcellulose, glycerin 15-55%
aa. 50-90% ethylmethylcellulose, glycerin 10-50%
bb. 60-98% xanthan gum, 2-40% anionic styrene acrylic co-polymer
cc. 50-90% sodium alginate, glycerin 10-50%
dd. 45-85% alginic acid, glycerin 15-55%
ee. 60-98% dextran, 2-40% anionic styrene acrylic co-polymer
ff. 55-95% microcrystalline cellulose, glycerin 5-45%
gg. 50-90% polyacrylamide, glycerin 10-50% hh. 55-95% polyvinyl ether polymers, glycerin 5-45%

Example 7

Figure 1:
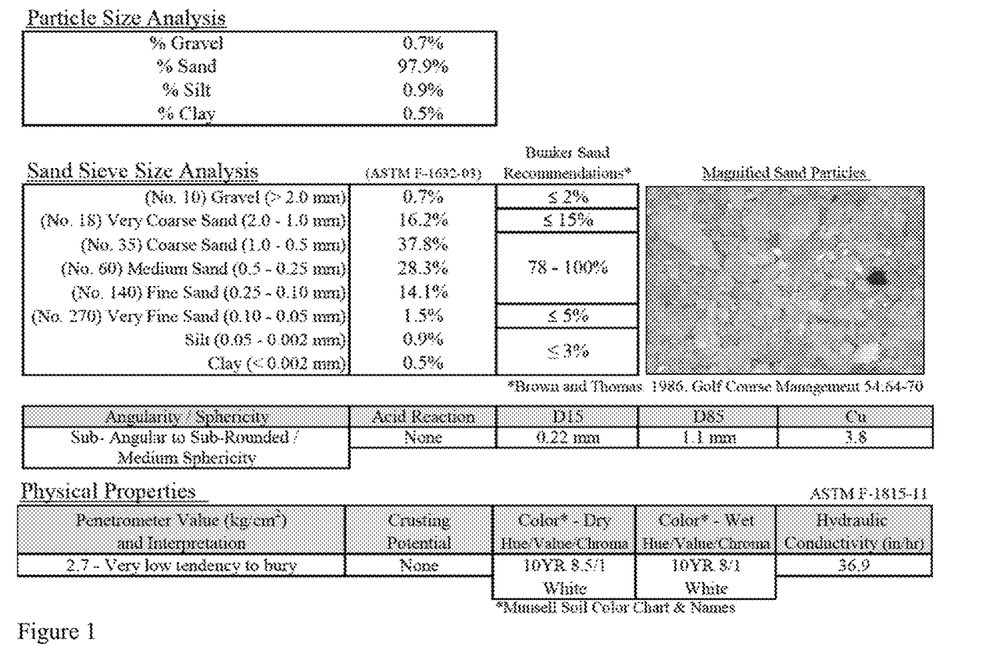
FIG. 1 shows the results of a representative soil physical properties test result for a standard bunker sand used in Examples 7, 8, 9, and 11.
Figure 2:
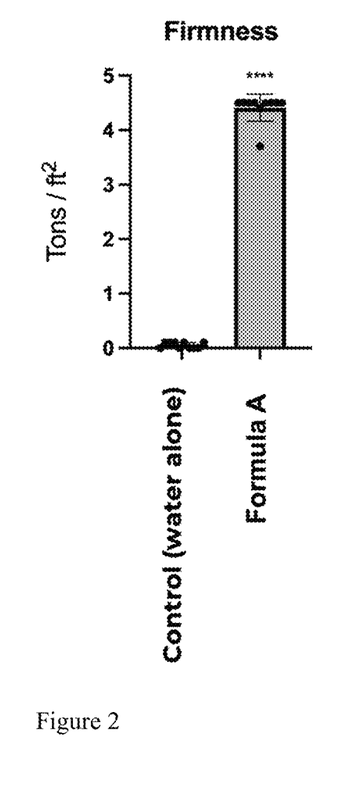
FIG. 2 shows the treatment with an example formulation increased bunker sand firmness in a petri dish. (****$p<0.0001$, analysis: unpaired t-test with a two-tailed p-value).

A laboratory test was developed to determine the effect of Formula A (containing colloidal MCC) on the firmness of bunker sands. Petri dishes (35 mm in diameter) were filled with a standard bunker sand with representative physical properties test results detailed in FIG. 1. Ten untreated dishes were treated with 3 milliliters of tap water and ten treated dishes were treated with 3 milliliters of a 1% suspension of Formula A. The dishes were allowed to dry for 4-7 days. A soil penetrometer was used to calculate the firmness of the bunker sand by inserting the soil penetrometer into the soil to a depth of 0.25 inches identified by the mark on the tip of the penetrometer. Formula A produced a statistically significant increase in bunker sand firmness compared to water alone as shown in FIG. 2.

Example 8

Figure 3A:
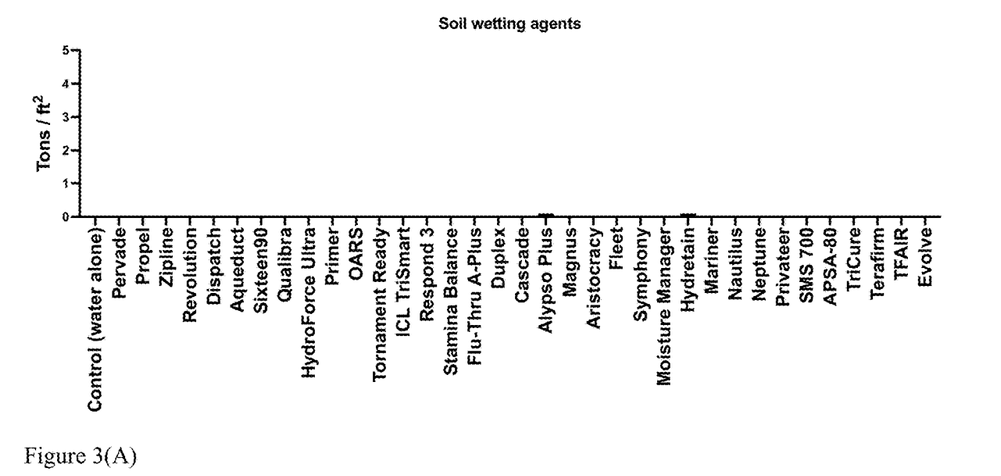
FIG. 3(A)-(C) show the treatment effect of different compounds on firmness of a bunker sand in a petri dish.
Figure 3B:
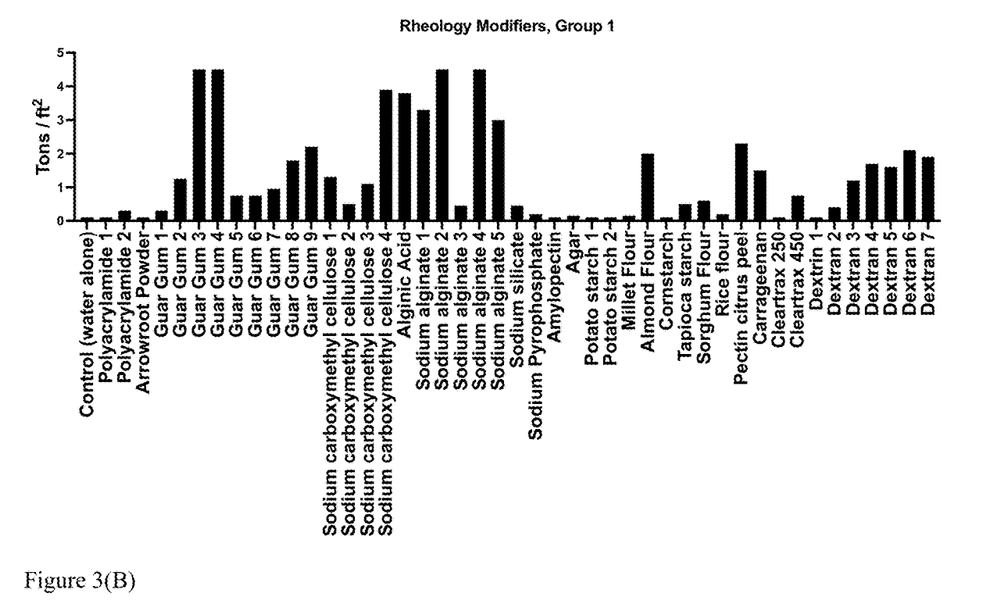
Figure 3C:
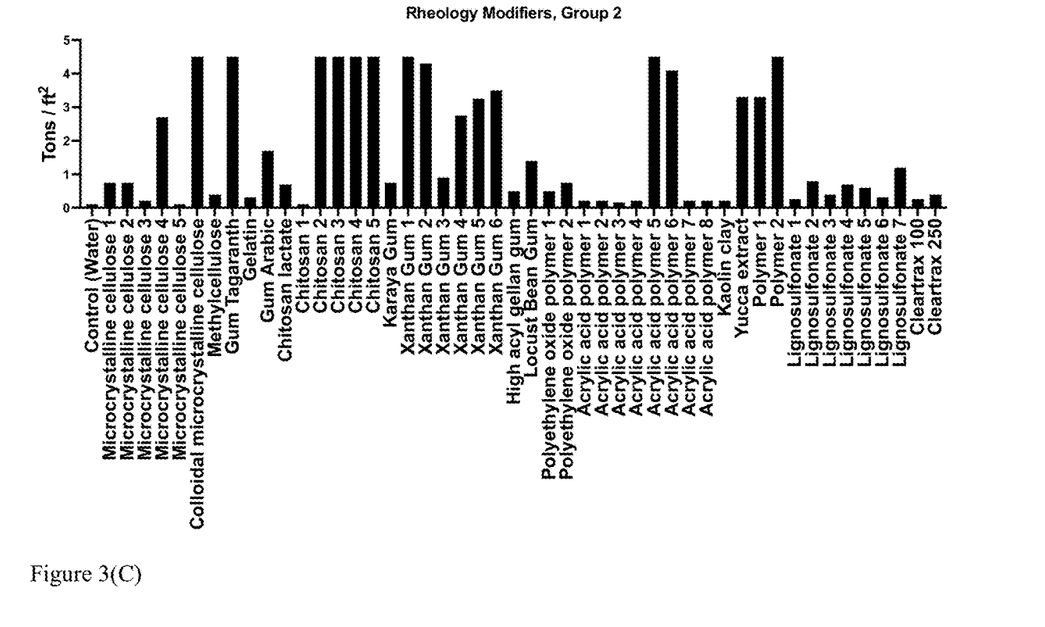

Various formulations with different ingredients were tested using procedures similar to that of example 7 to screen multiple compounds for their effect on firming bunker sands. As shown in FIG. 3, treatment of a standard bunker sand (FIG. 1) with multiple soil wetting agents and various compounds (rheology modifiers) had varying effects on bunker sand firmness. Of note, some of the surfactants tested in this experiment are marketed for increasing turf firmness by helping to release water from the surface of the soil, as soil moisture content is inversely proportional to soil firmness. However, none of these surfactants increase the firmness of a standard bunker sand more than water alone. In contrast, some compounds (rheology modifiers) were able to increase the firmness of a standard bunker sand above that of water alone. Some compounds (rheology modifiers) increased firmness of a standard bunker sand, but many had little to no more effect on increasing bunker firmness compared to water alone.

Example 9

Two sand boxes sized 5'×5' were constructed using pressure-treated lumber. Each sand box was filled with 5 inches of a standard bunker sand (FIG. 1) to approximate the depth of bunker sands used in a typical sand bunker on a golf course. A soil penetrometer was modified by placing a golf ball on the end of the penetrometer and used to measure the compressive and shear forces exerted into the bunker sand. Measurements were taken five times prior to the treatment of the bunker sands to ensure the firmness of the sand in the untreated sand box was equivalent to the firmness of the sand in the treated sand box. Formula B (Formula A+lignosulfonate) was applied at an application rate of 15 gallons per 1000 ft$^2$ and subsequently watered into the treated sand box with one gallon of water. Water was applied at the same application volume as used for the treated sandbox and subsequently watered into the untreated sand box with one gallon of water. Firmness measurements were taken over the next 4 weeks using the golf ball-modified soil penetrometer by splitting each 5'×5' sand box into ~9 square zones. After the first application and drying cycle, the treated sand formed a crust on the surface of the soil. This crust was broken by walking over the entire surface and raking the sand smooth. After every ~4 days of testing the firmness in each sand box, the sand box sand was raked and smoothed using a garden rake. Firmness data from five pretreatment measurement dates and eighteen post-treatment measurement dates were analyzed by linear mixed-effects models (LMM) using R (R Core Team, 2014) and the lme4 package. P values were obtained by likelihood ratio tests that compared a full model with the Formula B treatment effect against a null model without the Formula B treatment effect, while controlling for the random effect of plot and the fixed effect of time.

Figure 4:
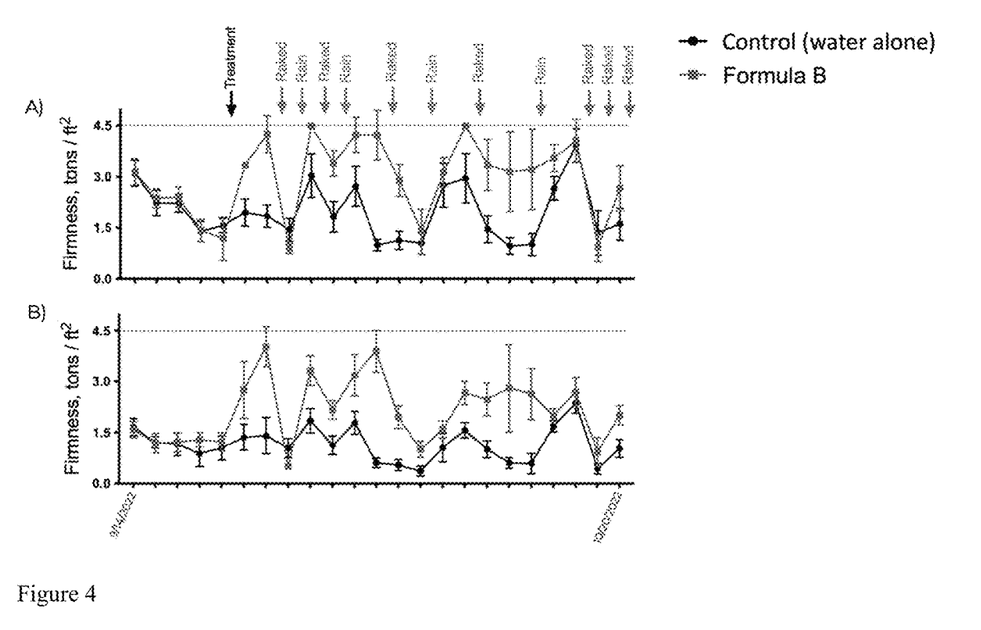
FIG. 4 shows the effect of an example formulation on an experimental sand bunker. (***$p<0.001$, analysis: linear mixed effects statistical modeling)

Firmness was measured using a modified soil penetrometer as described above. Compressive forces were measured by pushing the modified soil penetrometer directly into the soil. Shear forces were measured by pushing the modified soil penetrometer directly into the soil with a quarter spin. Both compressive and shear forces were statistically significantly increased in the Formula B-treated sand box. As shown in FIG. 4, treatment of a standard bunker sand with Formula B increased bunker sand firmness in a simulated sand box bunker. Bunker sand firmness was measured 2-4 times weekly using a modified soil penetrometer as described in the methods. The day of treatment, rain and rake events are shown by the arrows at the top of the graph. Compressive (A) and shear (B) firmness was not different between the sand boxes in the five measurements before treatment using LMM statistical analysis as described in the methods (FIG. 4). Compressive (A) and shear (B) firmness were different between the sand boxes in the measurements after treatment using LMM statistical analysis as described in the methods with Formula B increasing firmness over the control (water alone) treatment (FIG. 4, p value <0.001).

Example 10

Various types of bunker sands, bunker types, and bunker problems were chosen to test the benefit of Formula B on improving bunker sand firmness, reducing fried egg lies, improving surface stability and traction at the bunker surface, reducing sand erosion from wind and rain, and reducing dust formation. On each course, a formulation containing Formula B was added to the spray tank, diluted 2- to 4-fold with water and agitated in tank to fully mix with water. Formula B was then applied using a handheld spray gun at a rate of 5-15 gallons per 1000 ft$^2$. For a first tested bunker, the steep-faced, green side bunker was raked and sprayed with Formula B to prevent erosion from wind, gravity, and rain. It was observed that the bunker sand was firmer after application and had minimal to no need for maintenance from sand being pulled down the steep faces by natural causes. For a second tested bunker, it was observed that after treatment the bunker was much firmer and offered improved playability with less fried egg lies. Of note, it was also described as the bunker needing the least amount of maintenance of the 100+ bunkers on the course. For a third tested bunker, it was observed that after application of Formula B, the golf course superintendent and maintenance staff described significantly less wind erosion and no problems with the soft sand falling down the steep face when dried out unlike the surrounding bunkers that continued to endure these problems. This reduced the labor needed to maintain this bunker. For a fourth tested bunker, after application of Formula B, significantly less wind erosion from these bunkers was observed, thus reducing the labor needed to maintain this bunker. For a fifth tested bunker, after application of Formula B, there was increased firmness of the newly applied angular bunker sand with reduced footprint marks and reduced fried egg lies.

Example 11

This experiment examined the effect of applying Formula A on water retention in soil. Experimental laboratory sand boxes were constructed out of PVC trim board with dimensions of 5.5" H×5.5" W×5.5" L. Experimental laboratory sand boxes were filled with a standard bunker sand (FIG. 1) and saturated with water or water treated with various concentrations of Formula A. TEROS 10 soil moisture sensors were used to measure VWC in the sand over time used the ZL6 CLOUD DATA LOGGER from METER.

Figure 5:
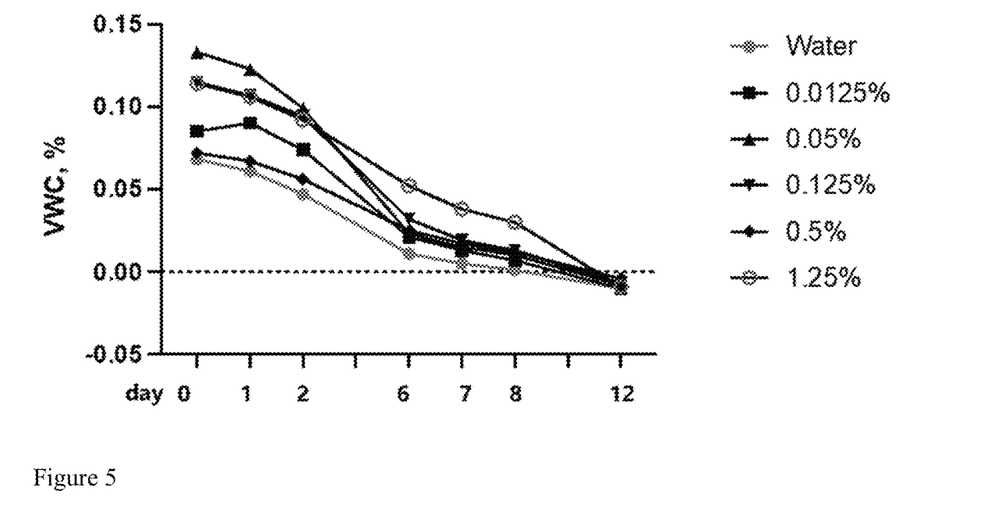
FIG. 5 shows treatment of a standard bunker sand with an example formulation at rates from 0.0125%-1.25% increased water retention in soil.

Soil moisture was measured after saturation of experimental laboratory sand boxes with water or various concentrations of an example formulation. As shown in FIG. 5, volumetric water content (VWC) was measured over 12 days from fully saturated soil to soil that was completely dry. Higher concentrations of the example formulation increased VWC in the soil and slowed its release over time.

The products can be tank-mixed with water as detailed in Example 1. Once evenly suspended in a spray tank, the products can be sprayed onto the surface of a sand bunker, turf field, soil, or other natural or artificial playing surface using the hand-held spray gun or at high volume application rates using a boom sprayer with multiple passes. The product should be watered into the soil with enough water to wash the product into the top 1 inch of the soil. Further drying of the playing surface will help to activate the product to its full firming potential. The applied dispersant should be applied at a rate of 1-30 pounds per 1,000 ft$^2$ in combination with the rheology modifier at a rate of 1-30 pounds per 1,000 ft$^2$ for ease of application and maximum benefit to the playing surface to which it is applied. Product longevity is dependent on microbial activity, amount of rainfall and applied irrigation water, management practices of the surfaces (such as raking, core aerification, sand-topdressing, drill and fill, deep vertical mowing, and sand injection), and soil erosion, amongst other factors. Product reapplication is expected to range from days to 1-12 months or more depending on the above-mentioned environmental and management factors.

It will be appreciated by persons skilled in the art that the inventions described herein are not limited to what has been particularly shown and described. Rather, the scope of the invention is defined by the claims which follow. It should further be understood that the above description is only representative of illustrative examples of embodiments. The description has not attempted to exhaustively enumerate all possible variations. The alternate embodiments may not have been presented for a specific component of a composition, or a step of the method, and may result from a different combination of described constituents, or that other undescribed alternate embodiments may be available for a formulation, kit or method, is not to be considered a disclaimer of those alternate embodiments. It will be appreciated that many of those undescribed embodiments are within the literal scope of the following claims, and others are equivalent.

The invention claimed is:

1. A method of optimizing soil or sand surface of a field, comprising applying a formulation to the field, wherein the formulation comprises an effective amount of one or more rheology modifying polymers comprising carboxymethylcellulose and microcrystalline cellulose.

2. The method of claim 1, wherein the one or more rheology modifying polymers further comprise one or more of alginate, cellulose gum, hydroxypropylmethylcellulose, and methylcellulose.

3. The method of claim 1, wherein the one or more rheology modifying polymers range from about 1% to about 30% by weight in the composition.

4. The method of claim 1, wherein at least 50% of the one or more rheology modifying polymers is microcrystalline cellulose.

5. The method of claim 4, wherein the microcrystalline cellulose has an average particle size ranging from 20-100 micrometers.

6. The method of claim 1, where the carboxymethyl cellulose has molecular weight ranging from about 1,000,000 to about 1,200,000 Daltons.

7. The method of claim 1, where the carboxymethyl cellulose has a substitution rate ranging from about 0.65 to about 0.75%.

8. The method of claim 1, wherein the one or more rheology modifying polymers further comprise xanthan gum.

9. The method of claim 8, wherein the xanthan gum has a degree of branching less than 25%.

10. The method of claim 1, wherein the one or more rheology modifying polymers further comprise sodium alginate.

11. The method of claim 10, wherein the sodium alginate has a molecular weight ranging from about 40,000 to about 330,000 Daltons.

12. The method of claim 1, wherein the formulation further comprises a dispersant, wherein the one or more rheology modifying polymers and the dispersant are in a ratio ranging from about 1:4 to about 10:1.

13. The method of claim 12, wherein the dispersant is selected from the group consisting of anionic styrene acrylic co-polymer, ethoxylated-, styrenated-, phenoxy-, or ammonium salt, ethylenediaminetetraacetic acid, lignin sulfonate, lignosulfonic acid ethoxylated sodium salt, lignosulfonic acid sodium salt, kraft lignin or alkali lignin, polyethylene oxide, polyvinyl pyrrolidone, powerblox d-205, powerblox d-518, sodium dioctyl sulfosuccinate, sodium dodecyl benzene sulfonate, sodium hexametaphosphate, naphthalene condensate, and sodium lignosulfonate.

14. The method of claim 12, wherein the dispersant is sodium lignosulfonate.

15. The method of claim 14, wherein the sodium lignosulfonate has a degree of sulfonation ranging from about 3% to about 4%.

16. The method of claim 1, wherein the method increases firmness of the sand surface of a sand bunker.

17. The method of claim 1, wherein the formulation is applied so that compressive force and/or shear force of the surface is increased by at least 1.5 times in comparison with an untreated surface.

18. The method of claim 1, wherein the formulation is applied so that volumetric water content is increased by 2-10 times in comparison with an untreated surface.

19. The method of claim 1, which reduces erosion from wind and rain events in comparison with an untreated field.

* * * * *